(12) United States Patent
Kim

(10) Patent No.: US 6,827,437 B1
(45) Date of Patent: Dec. 7, 2004

(54) PIVOTABLE SUNSHADE CLIP FOR SPECTACLES

(76) Inventor: Kyu-Sin Kim, #21-1, 3-Ga, Nowon-Dong, Buk-Gu, Taegu (KR)

( * ) Notice: Subject to any disclaimer, the term of this patent is extended or adjusted under 35 U.S.C. 154(b) by 0 days.

(21) Appl. No.: 10/639,482

(22) Filed: Aug. 13, 2003

(51) Int. Cl.$^7$ ................................................. G02C 9/00

(52) U.S. Cl. .......................................... 351/47; 351/57

(58) Field of Search ..................................... 351/47, 57

(56) References Cited

U.S. PATENT DOCUMENTS

| | | | | |
|---|---|---|---|---|
| 6,695,448 B2 | * | 2/2004 | Xiao | 351/57 |
| 6,698,881 B1 | * | 3/2004 | Kim | 351/47 |
| 6,702,439 B1 | * | 3/2004 | Lee | 351/47 |

* cited by examiner

Primary Examiner—Huy Mai
(74) Attorney, Agent, or Firm—Piper Rudnick LLP

(57) ABSTRACT

Disclosed herein is a pivotable sunshade clip for spectacles. The spectacles comprise lens frames having lenses fitted therein and a bridge connected between the lens frames. The lens frames are provided at the outer ends thereof with coupling members. To the coupling members are attached hinges pivotably connected with earpieces. The sunshade clip comprises lens frames having colored lenses fitted therein and a bridge connected between the lens frames. The spectacles further comprise spectacles magnet portions provided at the rear parts of the coupling members of the spectacles. The spectacles magnet portions are outwardly extended so that magnet insertion spaces are defined between the coupling members and the spectacles magnet portions. The spectacles magnet portions have spectacles magnets embedded therein. The sunshade clip further comprises hinge arms attached to the outer ends of the lens frames, hinge operating units attached to the hinge arms, and clip magnet portions attached to the hinge operating units. The hinge operating units are extended rearward and pivoted upward or downward about pivot pins provided at the hinge operating units.

2 Claims, 4 Drawing Sheets

PIVOTABLE SUNSHADE CLIP FOR SPECTACLES

BACKGROUND OF THE INVENTION

1. Field of the Invention

The present invention relates to a pivotable sunshade clip for spectacles, and more particularly to a pivotable sunshade clip for spectacles that can be stably attached to the spectacles not only when in use but also when not in use.

2. Description of the Related Art

As is generally known, various kinds of sunshade clips, each of which can be detachably attached to spectacles, have been used instead of sunglasses. Especially, a type of sunshade clip comprising two lens frames, each of which has a colored lens fitted therein, and fixing members or magnets mounted to the lens frames for detachably attaching the lens frames to ordinary spectacles has been proposed long ago.

Such sunshade clips are disclosed, for example, in Korean Patent Unexamined Publication No. 1998-064118, U.S. Pat. No. 5,416,537 to Frank Sadler, U.S. Pat. No. 5,568,207 to Richard Chao, U.S. Pat. No. 5,642,177 to Takahiro Nishihoka, U.S. Pat. No. 5,882,101 to David Yinkai Chao, U.S. Pat. No. 4,070,103 to Meeker, U.S. Pat. No. 5,642,177 to Sunreeve, European Patent No. 1,061,253, and German Patent No. 8,507,761U.

Especially, a sunshade clip with magnets mounted therein, which can be detachably attached to the spectacles by means of the magnets, is well and widely known, various examples of which are disclosed in several Korean patents, US patents, and other foreign patents. Furthermore, various modifications have been made to such a sunshade clip with magnets mounted therein.

Each of the aforesaid sunshade clips has a magnet mounted to either end of the clip, which is magnetically attached to a magnet mounted in a corresponding bridge or hinge of spectacles and having a magnetic polarity opposite to that of the magnet mounted to the clip.

All of the conventional sunshade clips have problems, however, in that they must be detached from the spectacles and then safely stored in additional spectacles cases or other places when they are not used and they must be attached again to the spectacles when they are to be used. For example, the conventional sunshade clips must be detached from the spectacles when users of the clips are in rooms or performing exercise. In this case, however, it is difficult to safely keep sunshade clips detached from the spectacles.

SUMMARY OF THE INVENTION

Therefore, the present invention has been made in view of the above problems, and it is an object of the present invention to provide a pivotable sunshade clip for spectacles that can be detachably attached to the spectacles with ease and simply stored when not in use.

It is another object of the present invention to provide a pivotable sunshade clip for spectacles that can be easily pivoted upward whenever it is temporarily not in use while it is attached to the spectacles so that the spectacles are normally used, thus increasing a user's convenience.

In accordance with the present invention, the above and other objects can be accomplished by the provision of a pivotable sunshade clip for spectacles, the spectacles comprising lens frames having lenses fitted therein and a bridge connected between the lens frames, the lens frames being provided at the outer ends thereof with coupling members, to the coupling members being attached hinges pivotably connected with earpieces, the sunshade clip comprising lens frames having colored lenses fitted therein and a bridge connected between the lens frames, wherein the spectacles further comprise spectacles magnet portions provided at the rear parts of the coupling members of the spectacles, the spectacles magnet portions being outwardly extended so that magnet insertion spaces are defined between the coupling members and the spectacles magnet portions, the spectacles magnet portions having spectacles magnets embedded therein, and wherein the sunshade clip further comprises hinge arms attached to the outer ends of the lens frames, hinge operating units attached to the hinge arms, and clip magnet portions attached to the hinge operating units, the hinge operating units being extended rearward and pivoted upward or downward about pivot pins provided at the hinge operating units, the clip magnet portions being extended downward, the clip magnet portions having spectacles magnets embedded therein, the clip magnet portions being inserted in the magnet insertion spaces, whereby the sunshade clip is securely attached to the spectacles due to magnetic attraction between the spectacles magnets and the clip magnets, and the sunshade clip is easily pivoted upward or downward about the pivot pins of the hinge operating units.

Preferably, one of the spectacles magnet embedded in each of the spectacles magnet portions and the clip magnet embedded in each of the clip magnet portions is a permanent magnet, and the other of the spectacles magnet embedded in each of the spectacles magnet portions and the clip magnet embedded in each of the clip magnet portions is substituted by a metal attractable by the permanent magnet.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a pivotable sunshade clip for spectacles according to a preferred embodiment of the present invention will be described in detail with reference to the accompanying drawings.

Figure 1:
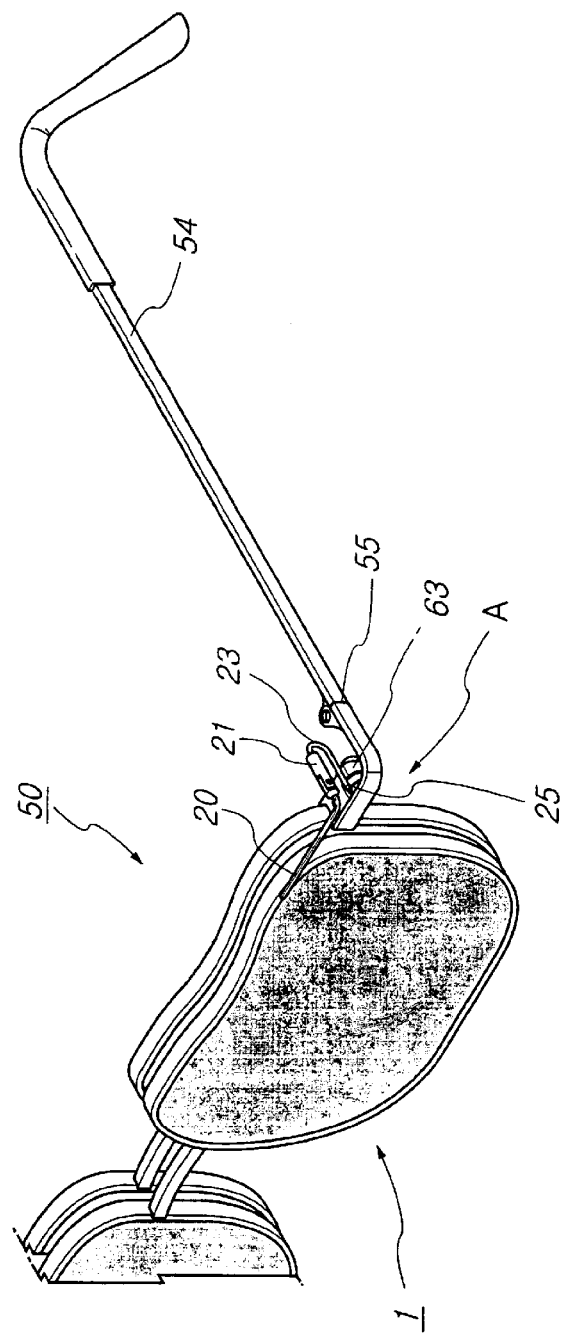
FIG. 1 is a partial perspective view of a pivotable sunshade clip for spectacles according to the present invention showing the sunshade clip attached to the spectacles.
Figure 2:
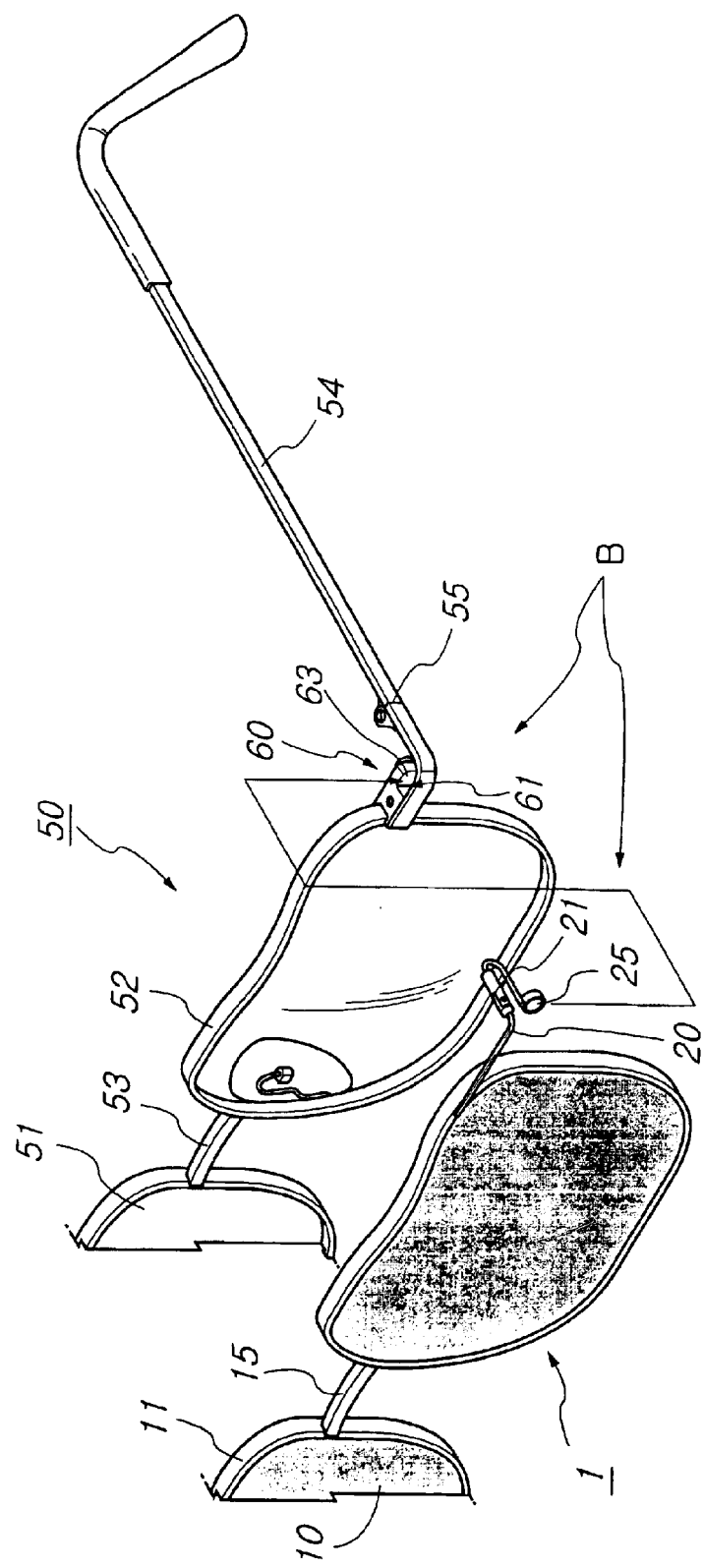
FIG. 2 is a partial perspective view of a pivotable sunshade clip for spectacles according to the present invention showing the sunshade clip detached from the spectacles.
Figure 3:
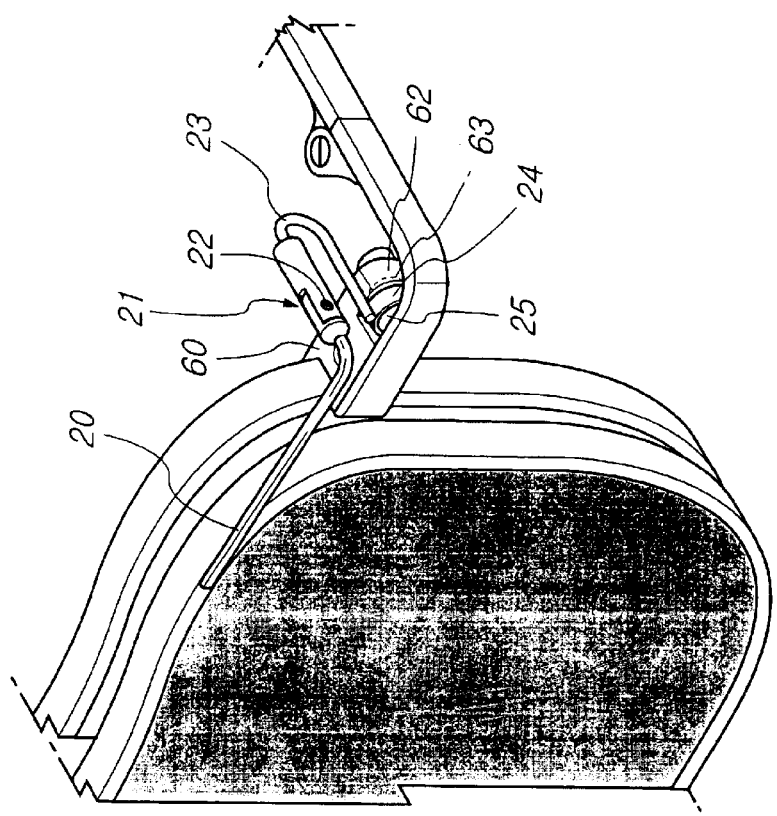
FIG. 3 is an enlarged perspective view of the A portion indicated in FIG. 1 showing main parts of the pivotable sunshade clip for spectacles according to the present invention.
Figure 4:
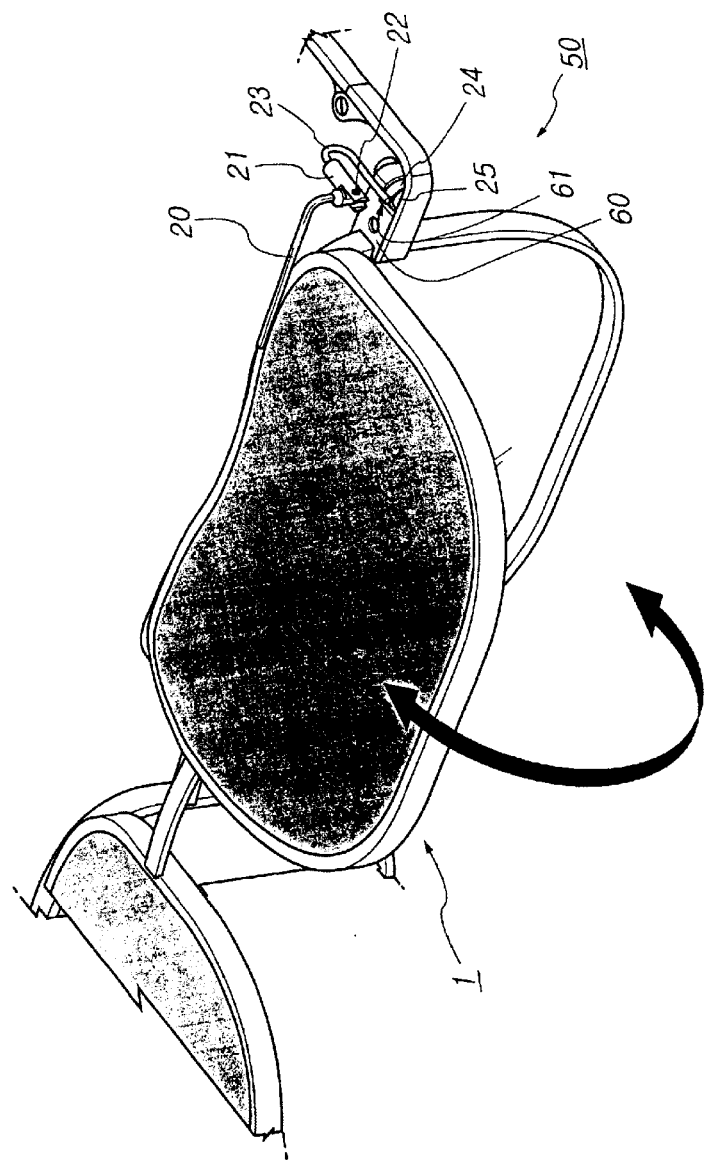
FIG. 4 is a partial perspective view of a pivotable sunshade clip for spectacles according to the present invention showing the upwardly pivoted sunshade clip, when seen in front of the spectacles.

FIG. 1 is a partial perspective view of a pivotable sunshade clip for spectacles according to the present invention showing the sunshade clip attached to the spectacles, FIG. 2 is a partial perspective view of a pivotable sunshade clip for spectacles according to the present invention showing the sunshade clip detached from the spectacles, FIG. 3 is an enlarged perspective view of the A portion indicated in FIG. 1 showing main parts of the pivotable sunshade clip for spectacles according to the present invention, and FIG. 4 is a partial perspective view of a pivotable sunshade clip for spectacles according to the present invention showing the upwardly pivoted sunshade clip, when seen in front of the spectacles.

Referring to the aforesaid drawings, especially to FIG. 1, a pivotable sunshade clip 1 for spectacles according to the present invention is attached to spectacles 50. The sunshade clip 1 comprises identical right and left clip parts attached to the corresponding identical right and left parts of the spectacles 50, one of which will accordingly be described hereinafter (the right clip part of the sunshade clip 1 in the drawings).

Preferably, the sunshade clip 1 is detachably attached to the spectacles 50 made of a metal.

As shown in the drawings, the spectacles 50, which are formed in a general structure, comprise lens frames 52 having lenses 51 fitted therein and a bridge 53 connected between the lens frames 52. Each of the lens frames 52 is provided at the outer end thereof with a coupling member 60. To the coupling member 60 is attached a hinge 55, which is pivotably connected with an earpieces 54.

As shown in the drawings, the sunshade clip 1 generally comprises lens frames 11 having colored lenses 10 fitted therein, a bridge 15 connected between the lens frames 11, and hinge arms 20 attached to the outer ends of the lens frames 11. It is to be understood, however, that a sunshade clip 1 without lens frames 11 may be also used. In such a sunshade clip 1, the hinge arms 20 are directly attached to the outer ends of the lenses 10 by means of bolts.

As described above, the lens frame 52 of the spectacles 50 is provided at the outer end thereof with the coupling member 60. The coupling member 60 is preferably securely attached to the lens frame 52, for example, by welding. The hinge 55 is attached to the coupling member 60. The coupling member 60 is provided at the rear part thereof with a spectacles magnet portion 62, which is outwardly extended, so that a magnet insertion space 61 is defined between the coupling member 60 and the spectacles magnet portion 62.

Specifically, the magnet insertion space 61 is formed by the combination of a front outward-extending portion of the coupling member 60, which is connected to the hinge 55, a main portion of the coupling member 60, which is attached to the lens frame 52, and the spectacles magnet portion 62, which together form the shape of a "[".

In the spectacles magnet portion 62 is embedded a spectacles magnet 63, which is, for example, a permanent magnet having relatively high magnetic flux density, and thus strong magnetic force.

To the hinge arm 20 of the sunshade clip 1 is attached a hinge operating unit 21, which is extended rearward. The hinge operating unit 21 comprises a pivotable part attached to the hinge arm 20, a stationary part, and a pivot pin 22 connecting the pivotable part and the stationary part.

To the stationary part of the hinge operating unit 21 is attached a connection member 23, which is curved in the shape of a "⊃" so that the connection member 23 has elasticity. To the end of the connection member 23 is attached a clip magnet portion 24, which is extended downward. In the clip magnet portion 24 is embedded a clip magnet 25, which is, for example, a permanent magnet having a magnetic polarity opposite to that of the spectacles magnet 63.

Since the spectacles magnet 63 and the clip magnet 25 have opposite magnetic polarities, they strongly attract each other.

Alternatively, one of the spectacles magnet 63 and the clip magnet 25 may be made of a permanent magnet having strong magnetic force, and the other of the spectacles magnet 63 and the clip magnet 25 may be substituted by a metal attractable by the magnet. This combination of a magnet and a metal provides the same effect as the combination of two magnets having opposite magnetic polarities.

The clip magnet portion 24 of the sunshade clip 1 is tightly inserted in the magnet insertion space 61 of the coupling member 60.

The operation of the pivotable sunshade clip for spectacles with the above-stated construction according to the present invention will now be described.

When a user wants to attach the sunshade clip 1 to the spectacles 50, he/she holds the sunshade clip 1 with one hand, and inserts the clip magnet portion 24 attached to the end of the connection member 23 of the sunshade clip 1 into the magnet insertion space 61 defined between the coupling member 60 and the spectacles magnet portion 62 of the spectacles 50. At this time, the sunshade clip 1 is securely attached to the spectacles 50 due to magnetic attraction between the spectacles magnet 63 embedded in the spectacles magnet portion 62 and the clip magnet 25 embedded in the clip magnet portion 24.

When the user does not want to use the sunshade clip 1 at a time when the sunshade clip 1 is attached to the spectacles 50 as mentioned above, he/she pushes up the sunshade clip 1 so that the sunshade clip 1 is easily pivoted upwardly about the pivot pin 22 of the hinge operating unit 21. Consequently, the user may read a book or do other activities even without safely storing the sunshade clip 1 in a spectacles case or other places.

When the user wants to use the sunshade clip 1 again, he/she pushes down the sunshade clip 1 so that the sunshade clip 1 is easily pivoted downwardly about the pivot pin 22 of the hinge operating unit 21.

As apparent from the above description, the present invention provides a pivotable sunshade clip for spectacles that can be easily pivoted downwardly about pivot pins of the hinge operating units provided at the outer ends of the sunshade clip, thereby increasing its adaptability to various environments for a user of the sunshade clip.

Furthermore, it is not necessary to safely store the sunshade clip of the present invention in a spectacles case or other places, whereby use of the sunshade clip is more convenient.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pivotable sunshade clip for spectacles, the spectacles comprising lens frames having lenses fitted therein and a bridge connected between the lens frames, the lens frames being provided at the outer ends thereof with coupling members, to the coupling members being attached hinges pivotably connected with earpieces, the sunshade clip comprising lens frames having colored lenses fitted therein and a bridge connected between the lens frames, wherein the spectacles further comprise spectacles magnet portions provided at the rear parts of the coupling members of the spectacles, the spectacles magnet portions being outwardly extended so that magnet insertion spaces are defined between the coupling members and the spectacles magnet portions, the spectacles magnet portions having spectacles magnets embedded therein, and wherein the sunshade clip further comprises hinge arms attached to the outer ends of the lens frames, hinge operating units attached to the hinge arms, and clip magnet portions attached to the hinge operating units, the hinge operating units being extended rearward and pivoted upward or downward about pivot pins provided at the hinge operating units, the clip magnet portions being extended downward, the clip magnet portions having spectacles magnets embedded therein, the clip magnet portions being inserted in the magnet insertion spaces, whereby the sunshade clip is securely attached to the spectacles due to magnetic attraction between the spectacles magnets and the clip magnets, and the sunshade clip is easily pivoted upward or downward about the pivot pins of the hinge operating units.

2. The sunshade clip as set forth in claim 1, wherein one of the spectacles magnet embedded in each of the spectacles magnet portions and the clip magnet embedded in each of the clip magnet portions is a permanent magnet, and the other of the spectacles magnet embedded in each of the spectacles magnet portions and the clip magnet embedded in each of the clip magnet portions is substituted by a metal attractable by the permanent magnet.

* * * * *